United States Patent [19]

Chung

[11] Patent Number: 5,632,680
[45] Date of Patent: May 27, 1997

[54] METHOD AND APPARATUS FOR CONTROLLING A COMPUTER GAME

[75] Inventor: Yau W. Chung, Fremont, Calif.

[73] Assignee: Quickshot Patent (BVI) Ltd., Wickhams Cay, Virgin Islands (Br.)

[21] Appl. No.: 512,885

[22] Filed: Aug. 9, 1995

[51] Int. Cl.$^6$ ............................................. A63F 09/24
[52] U.S. Cl. .................... 463/36; 273/148 B; 463/39; 463/38; 345/156; 345/157; 345/162
[58] Field of Search .................. 463/36–39; 273/148 B; 345/156–157, 161–163, 169

[56] References Cited

U.S. PATENT DOCUMENTS

| | | | |
|---|---|---|---|
| 4,462,594 | 7/1984 | Bromley et al. | 463/37 |
| 4,512,567 | 4/1985 | Phillips | 463/37 |
| 4,542,897 | 9/1985 | Melton et al. | 463/37 |
| 4,630,817 | 12/1986 | Buckley | 463/37 |
| 4,637,605 | 1/1987 | Ritchie | 463/37 |
| 4,976,435 | 12/1990 | Shatford et al. | 463/36 |
| 5,364,271 | 11/1994 | Aknin et al. | 273/148 B |
| 5,389,950 | 2/1995 | Bouton | 345/156 |

OTHER PUBLICATIONS

Lewis C. Eggebrecht, "Interfacing to the IBM Personal Computer", Howard W. Sams & Co., 1983, First Edition, Fifth Printing—1987, Chapters 12 and 18.

*Primary Examiner*—Jessica Harrison
*Assistant Examiner*—Mark A. Sager
*Attorney, Agent, or Firm*—Lisa D. Noble; Albert C. Smith

[57] ABSTRACT

A computer game controller system and method has a pulse position modulated (PPM) input device for encoding status information in a pulse position control signal and a bimodal interface having a first and second interface circuits, each for coupling an input device to a computer game program. The first interface circuit is a pulse position signal decoder for decoding a pulse position control signal. The second interface circuit is a capacitor charge decoding circuit for decoding a variable resistance input compatible with the IBM game port standard. When the bimodal interface is coupled to a PPM input device, the received pulse position control signal is decoded with improved accuracy and speed using the first interface (the PPM decoder). However, when the bimodal interface is coupled to a conventional input device which generates a variable resistance input conforming to the IBM game port standard, the second interface (the capacitor charging network) is used to decode the control signal.

21 Claims, 7 Drawing Sheets

METHOD AND APPARATUS FOR CONTROLLING A COMPUTER GAME

BACKGROUND OF THE INVENTION

1. Field of the Invention

This invention relates generally to computer game controllers and particularly to controllers for generating control data indicating the status of an input device.

2. Description of the Related Art

Conventionally, a computer game is responsive to a command received from a control device such as a joystick, a throttle, push buttons or other control mechanism operated by a user. An interface circuit is coupled to the control device to covert the command to control data for use by the computer game software. The interface circuit generally resides on an electronic circuit card such as a computer motherboard, a game controller card, a multimedia sound card or a PCMCIA (Personal Computer Memory Card International Association) card. These electronic circuit cards conventionally have an input port (a game port) for receiving control signals from the externally located control device. Industry standards have developed specifying the input port configuration. One industry standard port in particular, the IBM standard game port established by International Business Machines, Inc. of Armonk, New York (IBM) is widely used by many computer games and external control devices and therefore it is desirable to maintain compatibility with the IBM standard game port. The IBM standard game port has several digital inputs and several resistance-sensing inputs.

FIG. 1 is a schematic diagram of one conventional game control system 100 compatible with the resistance sensing-input of a conventional game port. Conventional control system 100 has an external input device 101 and a game card 108 residing internal to a computer. Conventional input device 101 has a control mechanism 107 such as a joystick, a switch, a push-button, a throttle or other input device. Input device 101 additionally has a variable resistance device 106 for producing a variable resistance corresponding to the position or status of control mechanism 107.

When conventional input device 101 is coupled to the resistance-sensing input of a conventional game card 108, a game program retrieves the status of control mechanism 107 by writing a command to interface circuit 102 and by then monitoring a status signal 109 for a state change. The time duration required for the state change corresponds to the status of control mechanism 107. Upon receiving a write command, interface circuit 102 uses a status circuit 105 to set status signal 109 to a first state and to allow capacitor 104 to charge. When capacitor 104 is charged to a predetermined threshold, status circuit 105 resets status signal 109 to a second state (the initial status) and discharges capacitor 104. Thus, a game program derives control information by monitoring the charging time of capacitor 104 using status circuit 105. FIG. 2 illustrates a conventional capacitor charging waveform 200 corresponding to the voltage across capacitor 104. A faster charging time indicates a smaller resistance value associated with variable resistance device 106 and in turn corresponds to the position or status of control mechanism 107.

Because the charging of capacitor 104 can take up to 2 milliseconds, determining the status of control mechanism 107 takes a long time as compared to the instruction cycle of the computer. There is an additional drawback in that the computer must monitor status signal 109 with a sufficiently high frequency in order to achieve a reasonable accuracy in measurement of the period of time taken to charge capacitor 104. The monitoring requirement makes it difficult for the computer to be sufficiently responsive to other devices or other tasks while running a game program.

The conventional resistance sensing-circuit has a further drawback of limited accuracy. In accordance with some conventional standards, the resistance-sensing input may have up to a 10% error due to the error tolerances of the resistor (5% error tolerance) and capacitor (5% error tolerance) circuit components. Additional accuracy problems are presented by computers having different operating speeds and thus require software to have calibrating routines to compensate for these operating speed differences. Additionally, conventional game control circuits have no latching or interrupt circuit to hold the signal status or to inform the computer that there exists a change in the signal status, hence the controller accuracy depends on how frequently the signal line is read.

Thus, there is a need for a computer game control device and method having improved speed and accuracy but that is also back-compatible the resistance-sensing inputs of conventional game cards.

SUMMARY OF THE INVENTION

In accordance with the present invention, there is provided computer game control system and method having improved speed and accuracy but which is also back-compatible with the resistance-sensing inputs of conventional game cards. The game control system comprises a pulse position modulation input device (a PPM input device) and a bimodal game card having a bimodal interface. The PPM input device generates a pulse position signal which is compatible with both the bimodal interface of the present invention and the resistance-sensing input of a conventional game card. Additionally, the bimodal interface is compatible with both the PPM input device and a conventional game input device.

The PPM input device has a pulse position signal generation circuit for encoding control information in a pulse position signal. In one embodiment, the pulse position generation circuit has a resistor network and an astable multivibrator for generating the pulse position signal. In this embodiment, the resistor network is electro-mechanically coupled to a user-actuated control mechanism to convert an input command to a corresponding resistance value. The resistance value is detected by the astable multivibrator to produce a pulsed output having pulse intervals corresponding to the resistance values. The pulse position signal is decoded by measuring the time interval between pulse positions. Alternatively, the pulse position signal of the present invention is decoded using a conventional interface circuit wherein the pulse position signal is used to charge a capacitor.

In accordance with the present invention, the bimodal interface comprises a first and a second interface circuit. In one embodiment, the first interface circuit comprises an advanced detector having a pulse detector, a counter coupled to the pulse detector and a storage device for storing updated control information recovered from the pulse position signal. The storage device is coupled to a program interface to provide the program with access to the most recent control data. The second interface circuit has a resistance-sensing circuit for generating a status signal coupled to the program interface. In one embodiment, the resistance-sensing circuit comprises a resistor serially coupled to a capacitor and a status control circuit coupled to the capacitor.

When a PPM input device in accordance with the present invention is coupled to the bimodal interface, the first interface circuit (the advanced detector) is used to decode the received PPM control signal. Using the advanced detector, the received PPM control signal is decoded by measuring the time interval between pulse positions and by storing the measured time interval.

When an input device conforming to the requirements of a resistance-sensing input of a conventional game card is coupled to the bimodal interface, the second interface circuit (the resistance-sensing circuit) is used to generate a status signal. Using the resistance-sensing circuit, the status signal is generated by charging the capacitor to a selected threshold and by setting the status signal to a first state for the charging duration and resetting the status signal to a second state once the capacitor has reached the selected threshold.

Because the advanced detector stores the most recent status data, because the capacitor charging duration is relatively long as compared to the program access time of the storage device and because the pulse position circuit is less prone to error due to component tolerances, the game control system and method of the present invention has improved speed and accuracy when using the first interface circuit (the advanced detector). Additionally, because the game control system has a second interface circuit (the resistance-sensing circuit) and because the pulse position signal is compatible with the resistance-sensing input of a conventional game card, the game control system and method of the present invention is also back-compatible with conventional game cards.

DESCRIPTION OF THE PREFERRED EMBODIMENT

Figure 1:
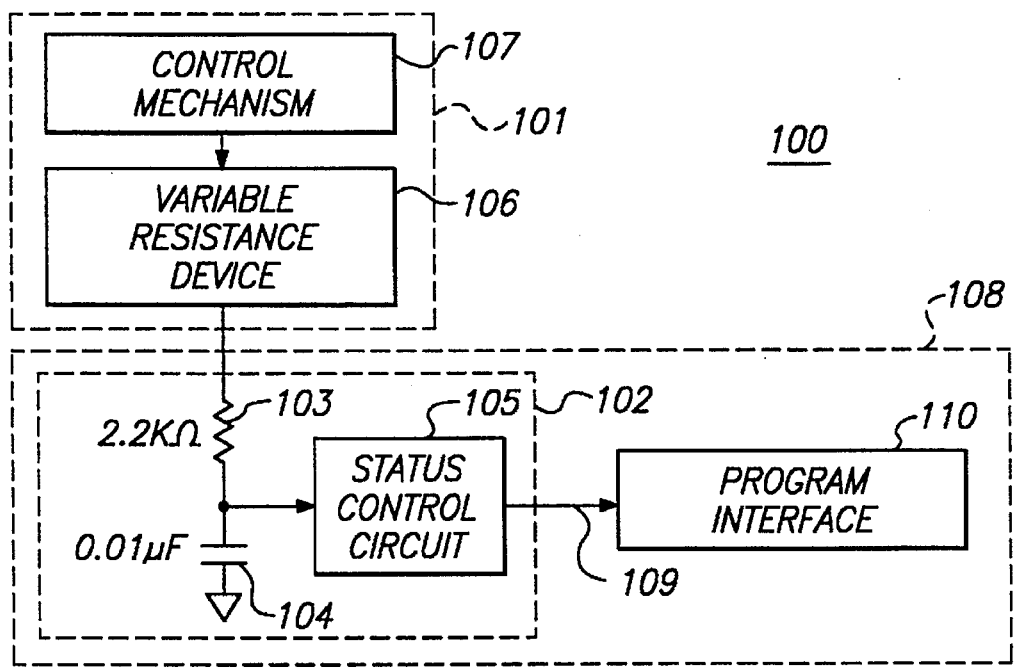
FIG. 1 is a schematic diagram of a conventional game control system.
Figure 2:
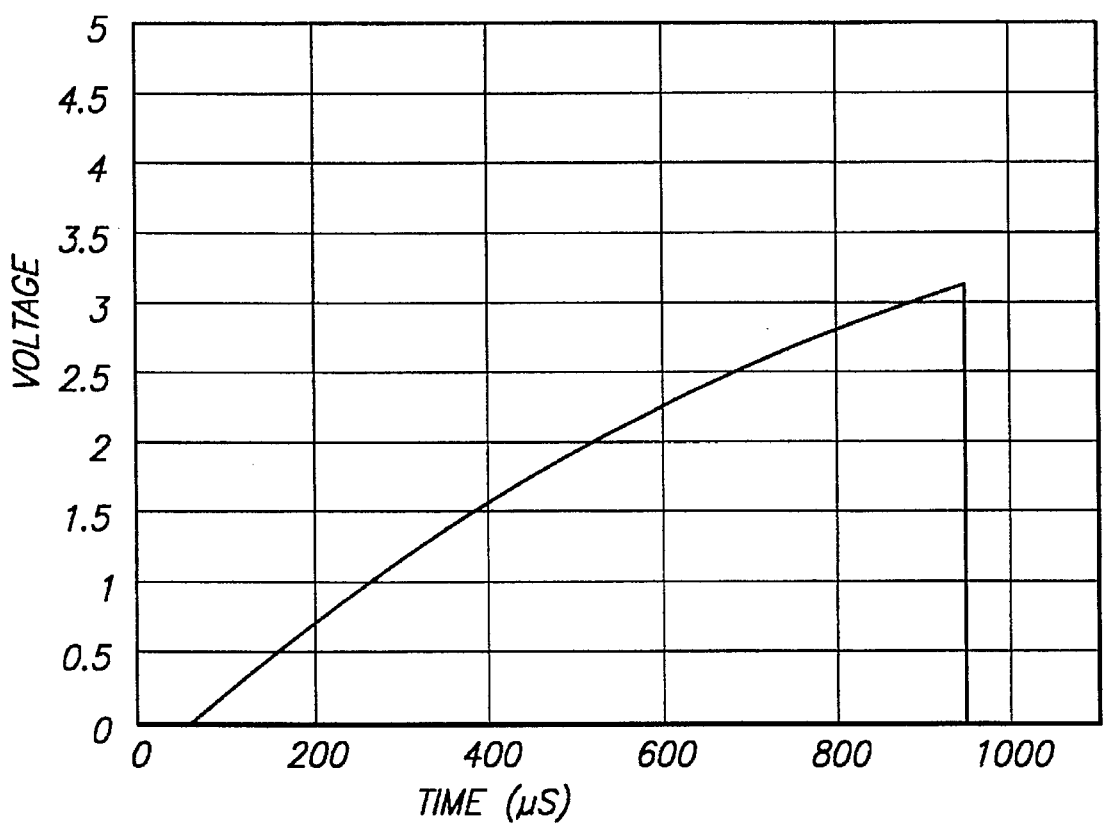
FIG. 2 is a graph of a charging waveform of a capacitor in a conventional game controller.
Figure 3:
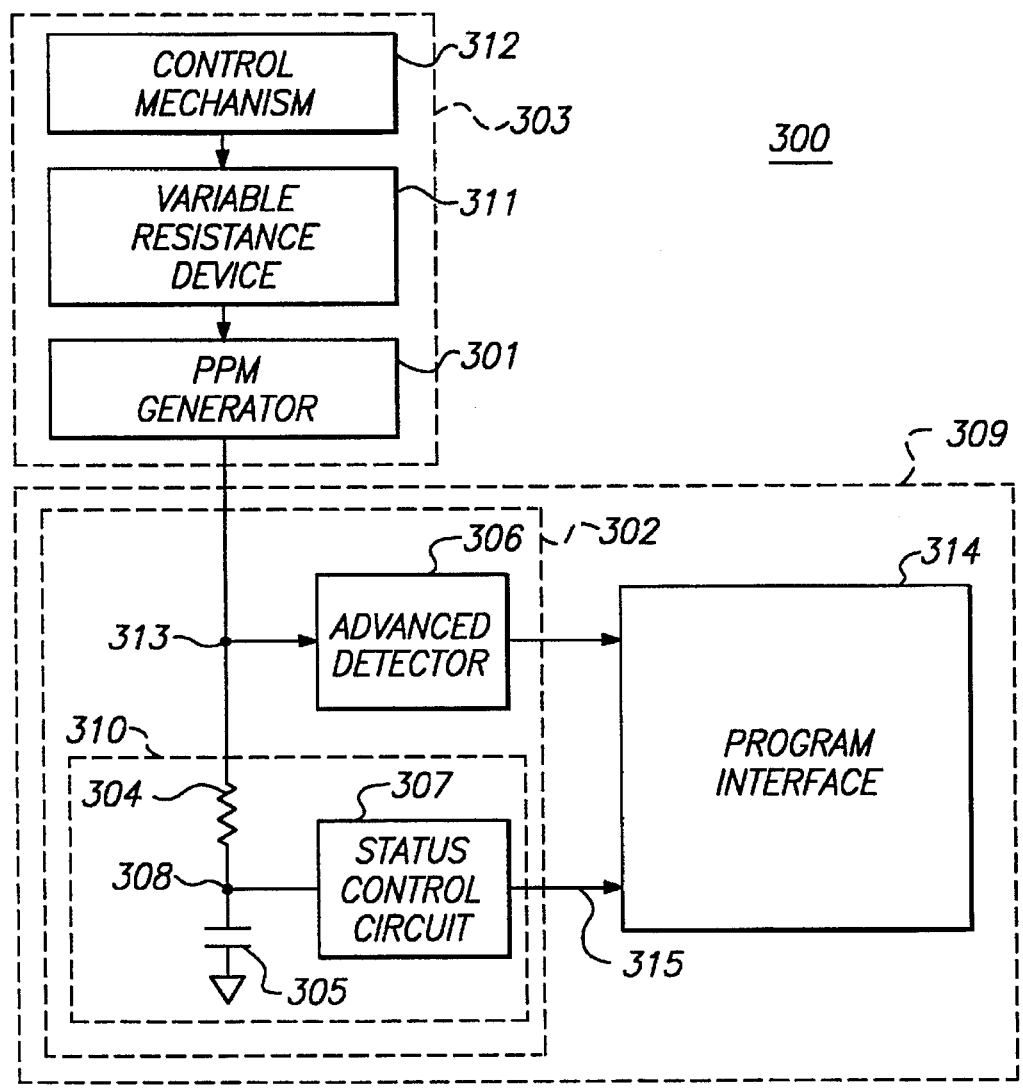
FIG. 3 is a block diagram of a PPM game control system in accordance with the present invention.

There is illustrated in FIG. 3, a block diagram of a pulse position modulation (PPM) game control system 300 in accordance with the present invention. PPM game control system 300 includes a PPM input device 303 coupled to a bimodal game card 309. FPM input device 303 has a control mechanism 312 coupled to a variable resistance device 311, which in turn is coupled to a PPM generator 301. Bimodal game card 309 has an input port 313 and a bimodal interface 302 coupled to a program interface 314.

Control mechanism 312 is a control device such as a joystick, a game paddle, a switch or switch set, a push-button or push-button set, a throttle or other user-actuated control device having a variable number of states or positions for indicating a user command. Variable resistance device 311 is an electro-mechanical link between control mechanism 312 and PPM generator 301. Variable resistance device 311 has a resistance corresponding to the current state of control mechanism 312 and thus corresponding to the current user command.

Figure 4:
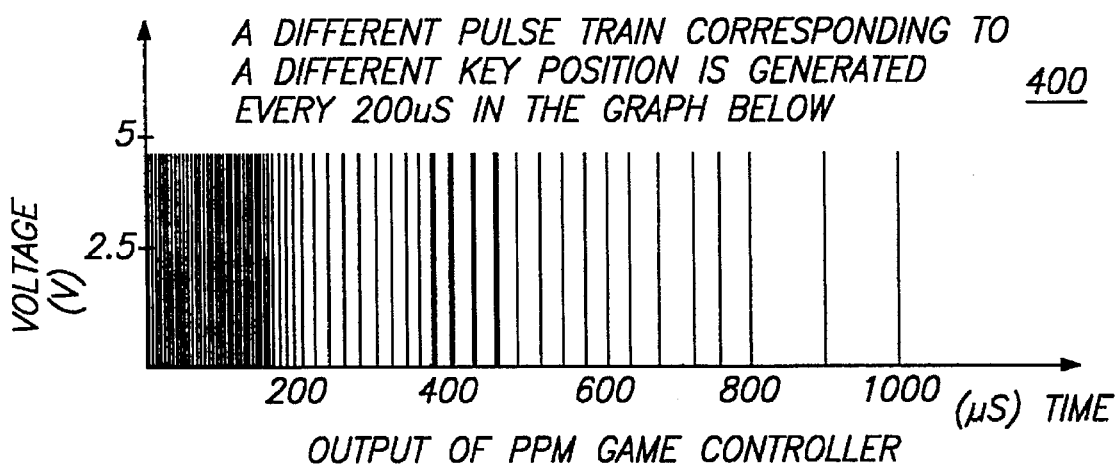
FIG. 4 is a graph illustrating a PPM control signal in accordance with the present invention.

PPM generator 301 is a pulse train generator for generating a PPM signal 400 (as illustrated in FIG. 4) having a variable pulse train frequency (or pulse time interval). The pulse train frequency corresponds to the user command received from control mechanism 312. In one embodiment, for example, the PPM signal 400 is used to encode the state of a five position switch. In this embodiment, a pulse train frequency of 100 KHz (corresponding to a pulse interval of 10 usec) corresponds to the first switch position, a pulse train frequency of 50 KHz (corresponding to a pulse interval of 20 usec) corresponds to the second switch position, a pulse train frequency of 33.3 KHz (corresponding to a pulse interval of 30 usec) corresponds to the third switch position, a pulse train frequency of 25 KHz (corresponding to a pulse interval of 40 usec) corresponds to the fourth switch position and a pulse train frequency of 10 KHz (corresponding to a pulse interval of 100 usec) corresponds to the fifth switch position. Thus, control information is encoded by the pulse frequency (or pulse interval) of the PPM signal 400.

Figure 5:
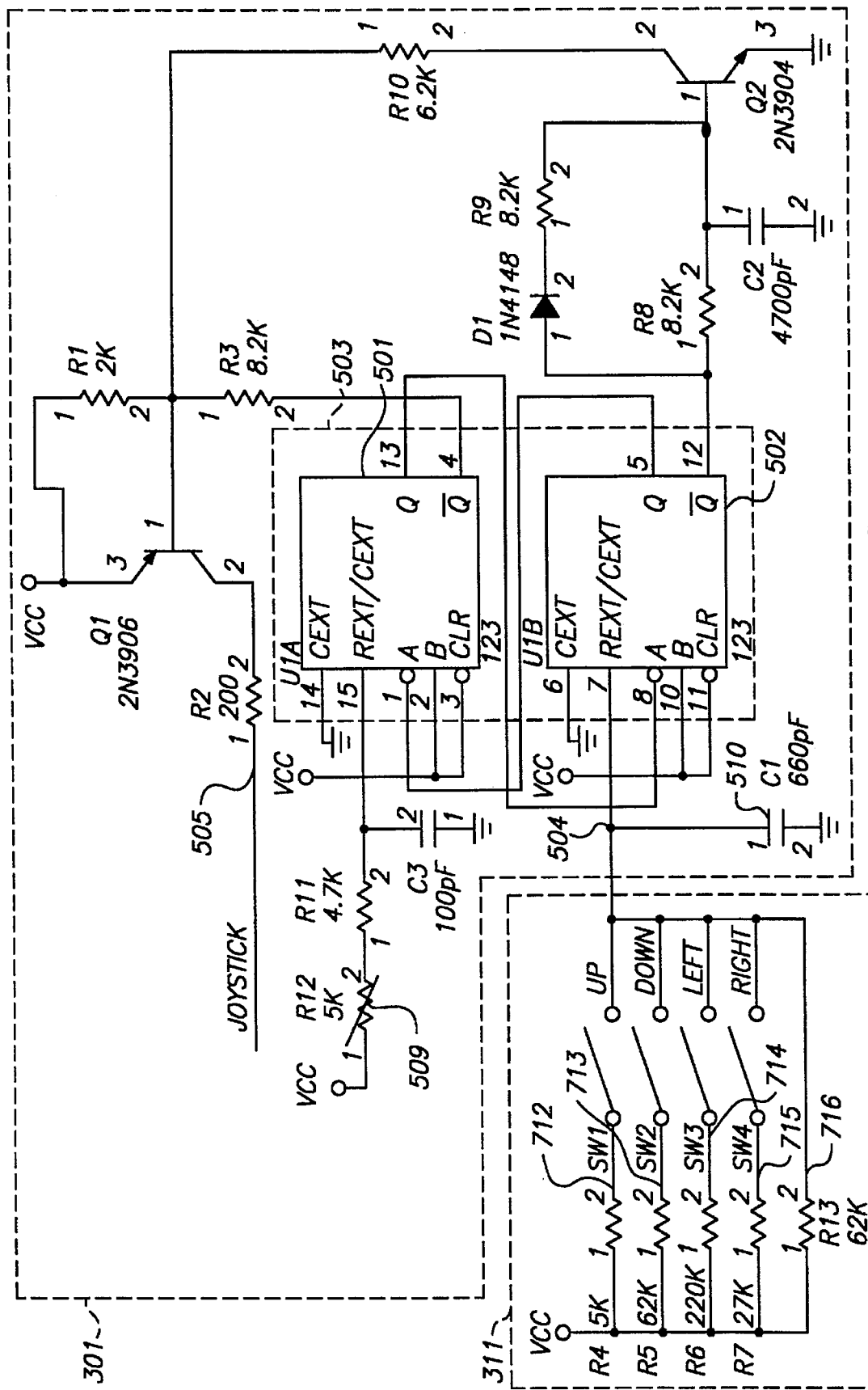
FIG. 5 is a schematic diagram of PPM generator in accordance with the present invention.

There is illustrated in FIG. 5 a schematic diagram of a PPM generator 301 in accordance with the present invention. PPM generator 301 includes monostable multivibrator 501 cross-coupled to a second monostable multivibrator 502 to form ring in which multivibrators 501, 502 trigger each other thus forming an astable multivibrator 503. PPM generator 301 also includes variable resistance input node 504 and PPM signal output node 505. In a preferred embodiment, monostable multivibrators 501, 502 are a 74LS123 semiconductor device. Pulse width accuracy of the generated PPM signal is fine tuned using trimming resistor 509. The pulse position is determined by capacitor 510 and the resistance between input node 504 and the voltage supply Vcc. In the preferred embodiment, component tolerances of 1% for resistors and 2% for capacitors are selected to achieve less than a 5% error in the generated PPM signal.

There is also illustrated in FIG. 5 a schematic diagram of variable resistance network 311. Variable resistance device 311 is an electro-mechanical resistor network having resistor-switch pairs 712–715 and resistor 716. Variable resistance device 311 has a variable resistance corresponding to the current position of control mechanism 312 (the user-actuated control device).

Referring again to FIG. 3, bimodal game card 309 has a bimodal interface 302 and a program interface 314. Bimodal interface 302 has an input node 312 and first and second interface circuits. The first interface circuit is advanced detector 306 and the second interface circuit is resistance detection circuit 310. Bimodal interface 302 of the present invention decodes PPM control signals 400 and is also compatible with capacitor charging waveform 201.

Figure 6:
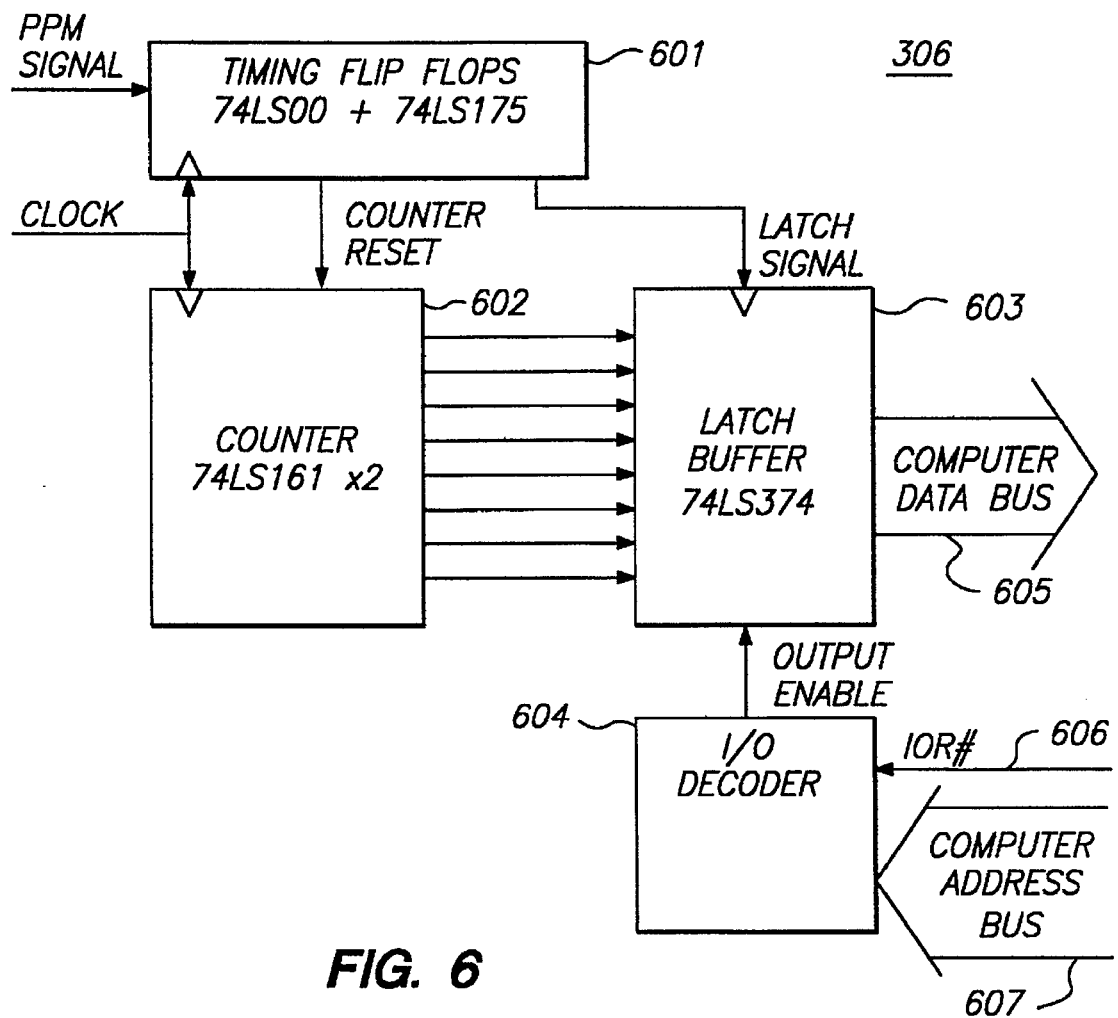
FIG. 6 is a schematic diagram of an advanced detector in accordance with the present invention.

There is illustrated in FIG. 6, a schematic diagram of a preferred embodiment of advanced detector 306. Advanced detector 306 is a pulse position detector and has an input for receiving PPM signal 400, an address bus input 607, a control input 606 and a data bus output 605. Advanced detector 306 additionally has a pulse detection circuit 601 activated by PPM signal 400, a counter 602, a storage device 603 and I/O decoder 604. Counter 602 is coupled to and reset by a first output of pulse detection circuit 601. The output of counter 602 is coupled to storage device 603. Storage device 603 is storage device such as a 74LS374 latched buffer. Storage device 603 latches the current count (status value) of counter 602 and stores the status value for reading by a game program using program interface 314. In a preferred embodiment, storage device 603 is a tri-state latch having an output enabled responsive to an output enable signal received from I/O decoder 604.

Figure 7:
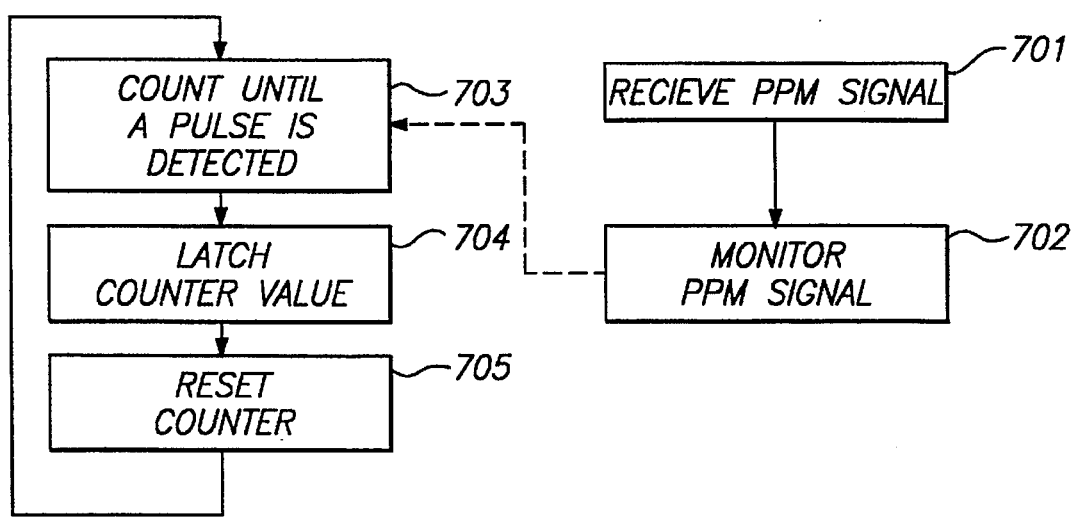
FIG. 7 is a flow diagram of the steps performed by an advanced detector in accordance with the present invention.

FIG. 7 is a flowchart of the steps performed by advanced detector 306. Advanced detector 306 receives 701 PPM control signal 400 from coupled PPM input device 303. PPM control signal 400 is monitored 702 using pulse detection circuit 601 for pulse detection. Counter 602 counts until a pulse is detected 703 by pulse detection circuit 601. Upon detection of a pulse, the current counter value is latched 704 in a storage device 603 and counter 602 is reset 705. The status information is latched and coupled to program interface 314 and thus is available to be read by a software program such as a computer game.

Because advanced detector 306 has a storage device 603 that is continually updated to contain the most recent decoded PPM signal pulse positions, there is no need for a write command to initiate a data collection cycle. Instead, the status information is encoded in the time duration between pulses and is continuously available to be read by a game program. Because the pulse intervals are relatively small, the advanced detector provides updated control data to the game program at a faster rate and with a higher degree of accuracy. Additionally, because the PPM signal is a digital pulse, the accuracy of advanced circuit 306 is not affected by resistor 304 and capacitor 305.

Figure 8:
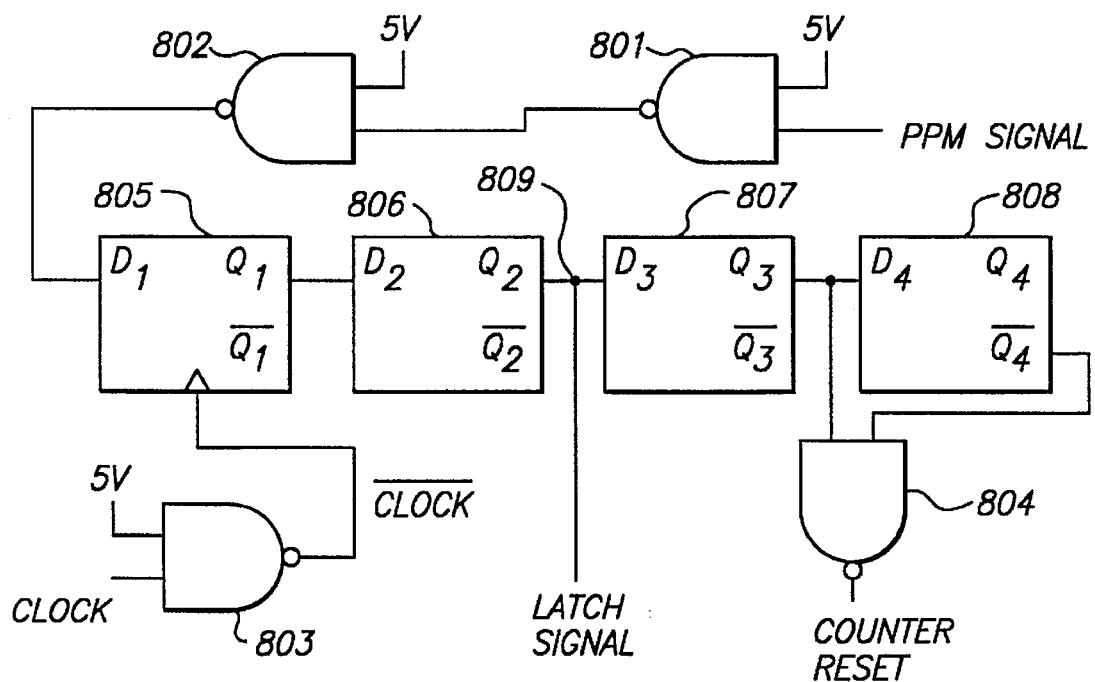
FIG. 8 is a schematic diagram of an pulse detection circuit in accordance with the present invention.
Figure 9:
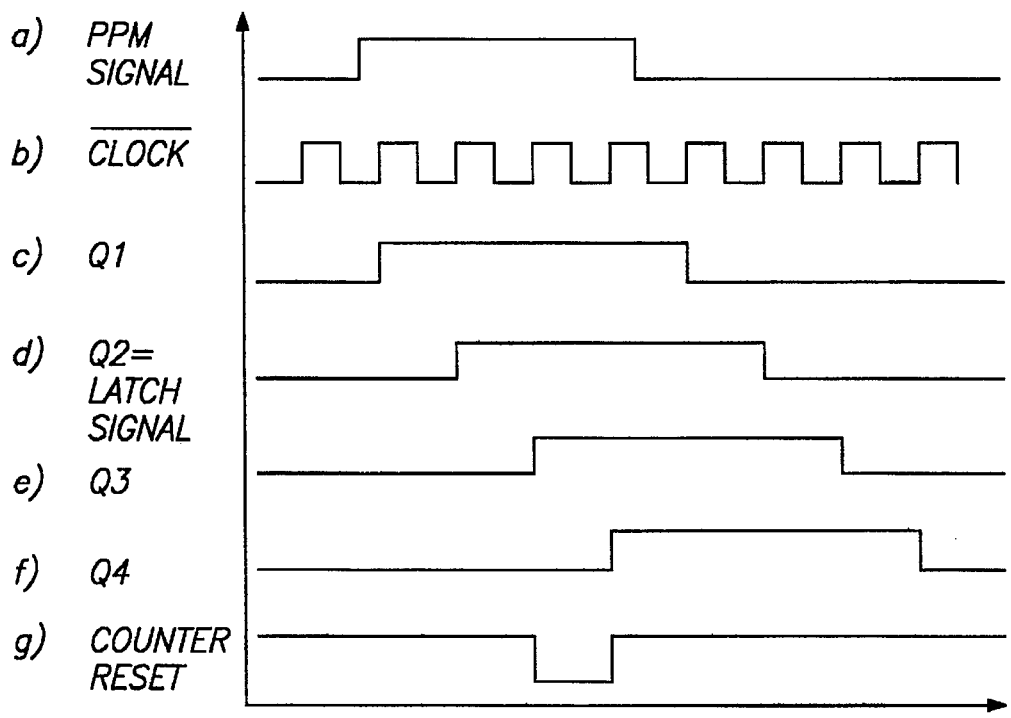
FIGS. 9a)–9g) are graphs illustrating the waveforms generated by the pulse detection circuit of the present invention.

There is illustrated in FIG. 8 a schematic diagram of pulse detection circuit 601. Pulse detection circuit 601 is a timing flip-flop circuit and includes buffering NAND gates 801, 802, clock NAND gate 803, buffer NAND gate 804, and flip-flops 805–808. Buffering NAND gates 801 and 802 are cascaded to couple a received PPM signal to cascaded flip-flops 805–808. NAND gates 801 and 802 are each inverting and thus result in a non-inverted signal when cascaded. Flip-flops 805–808 have clock inputs coupled to the output of clock NAND gate 803 which buffers the received clock signal. Cascaded flip-flops 805–808 generate a latch signal 809 and a counter reset signal responsive to receiving a pulsed input. Latch signal 809 is coupled to the clock input of storage device 603. FIG. 9 illustrates the waveforms generated by flip-flops 805–808.

Referring again to FIG. 3, resistance detection circuit 310 includes resistor 304, capacitor 305 and status control circuit 307. Resistor 304 has a first terminal coupled to input node 313 and is serially coupled to capacitor 305 to form a resistor-capacitor node 308 at the second resistor terminal. Status control circuit 307 has an output status signal 315 for indicating the charging status of capacitor 305. Status control circuit 307 is coupled to resistor-capacitor node 308 and to program interface 314 by status signal 315. In a preferred embodiment, status control circuit 307 is a triggerable monostable multivibrator.

Figure 10:
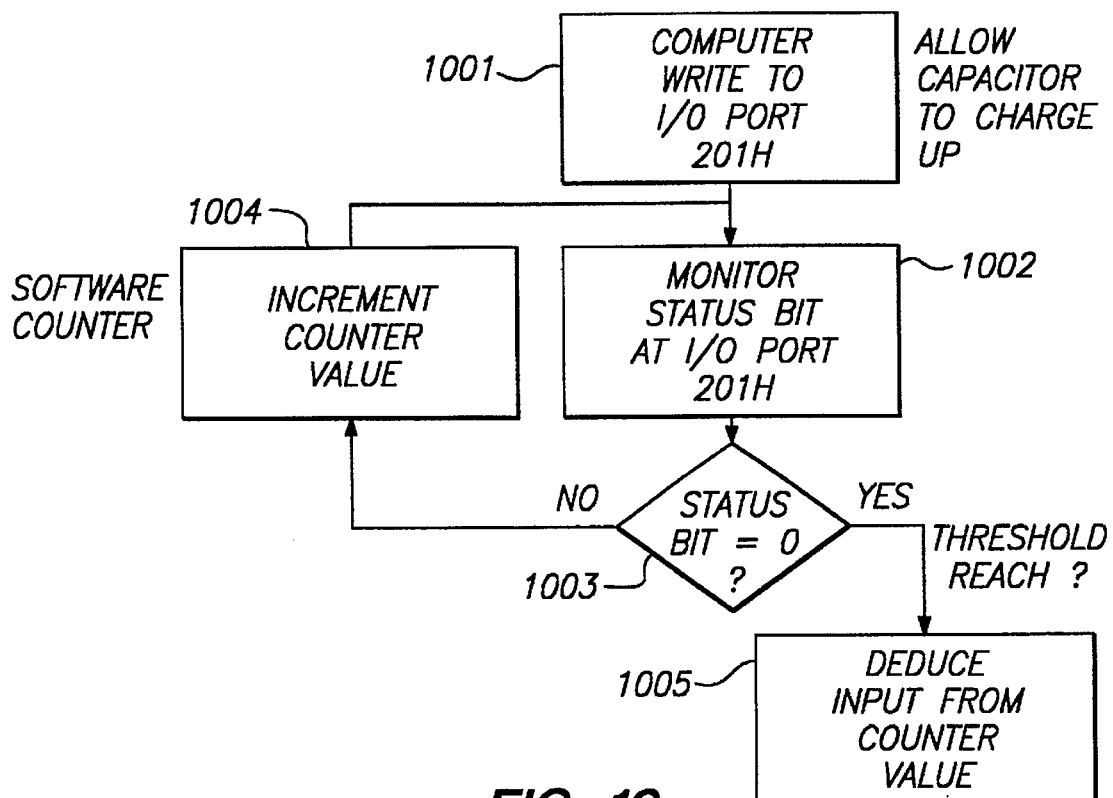
FIG. 10 is a flow diagram of a method of receiving status information using a resistance detection circuit in accordance with the present invention.

FIG. 10 is a flow diagram of a method of receiving status information using resistance detection circuit 310. A game program retrieves the input device status by writing 1001 a command to status control circuit 307 via program interface 314. Upon receiving the write command, status control circuit 307 sets status signal 315 to a first state and allows capacitor 305 to charge. Once capacitor 305 has charged to a predetermined threshold, status control circuit 305 resets status signal 315 to a second state. The game program monitors 1002 status signal 315 and compares 1003 the current state of status signal 315 to the second state. During the monitoring process, a counter value is incremented 1004 to measure the elapsed capacitor charging time. Once status signal 315 transitions to the second state the game program determines the elapsed capacitor charging time and deduces 1005 a control command corresponding to the charging time.

In operation, PPM input device 303 and bimodal game card 309 are compatible with each other and are each additionally back-compatible with input devices 101 and game cards 108 having interfaces conforming to the resistance-sensing input of the IBM standard game port. Thus, the PPM game control system has three modes of operation: (i) PPM input device 303 coupled to bimodal game card 309; (ii) PPM input device 303 coupled to a conventional game card device; and (iii) a conventional input device coupled to bimodal game card 309.

Mode 1. PPM Input Device Coupled to a Bimodal Game Card

When PPM input device 303 is coupled to bimodal game card 309, the first interface circuit (advanced detector 306) is used to derive and store status information to be read by the game program. In this configuration, status signal 315 generated by the second interface circuit (resistance detection circuit 310) will not be used by a game program having the capability to recognize and access the bimodal game card.

Mode 2. PPM Input Device Coupled to a Conventional Game Card

Figure 11:
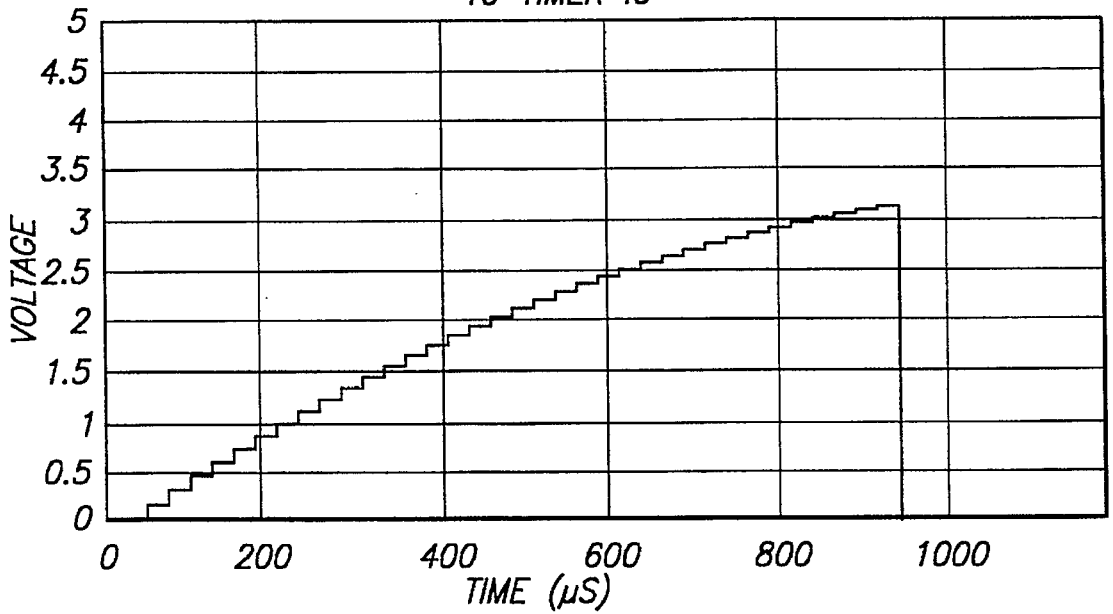
FIG. 11 is a graph illustrating a stepped charging waveform in accordance with the present invention.
Figure 12:
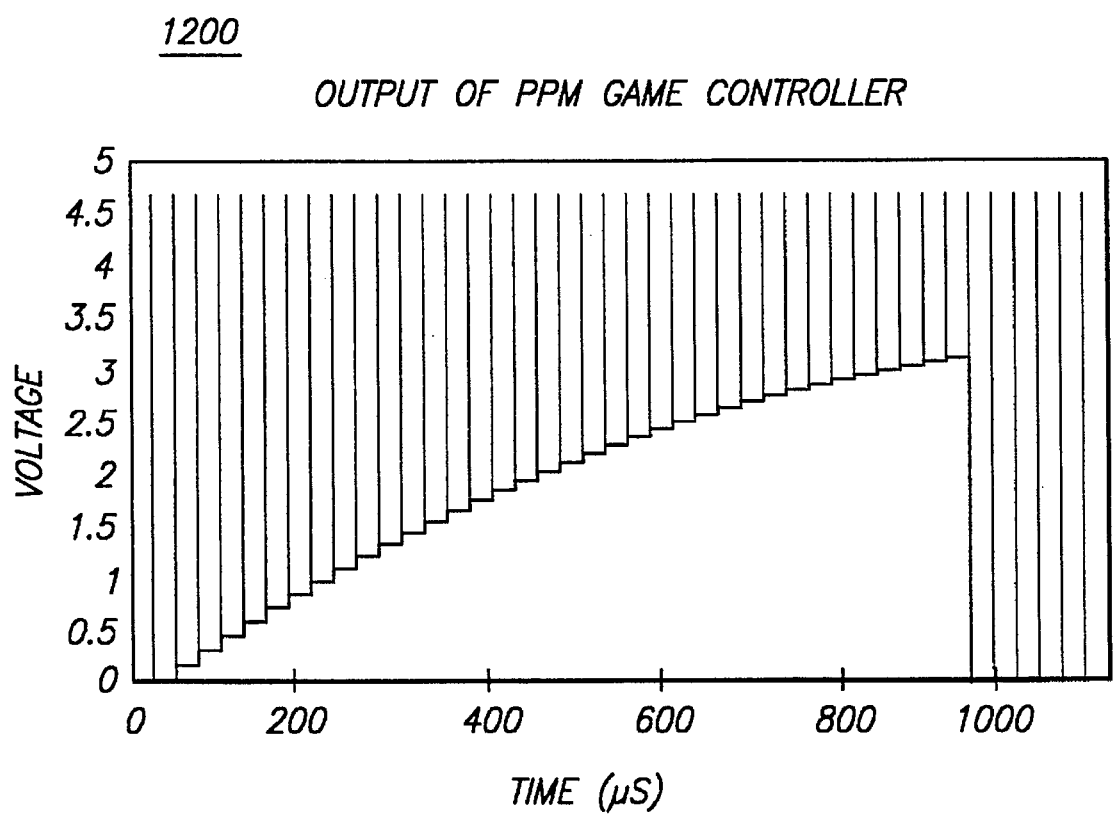
FIG. 12 is a graph illustrating an overlay of a stepped charging waveform and a PPM signal in accordance with the present invention.

When PPM input device 303 is coupled to conventional game card 108 having a conventional interface circuit 102, capacitor 104 charges at a rate determined by the frequency and pulse duration of the pulse train comprising PPM signal 400. The charging rate is fine tuned using trimming resistor 509 to fine tune the pulse width of the pulses. PPM signal 400, when coupled to capacitor 104, charges capacitor 104 by applying voltage impulses and thus generates a stepped charging waveform 1100 as illustrated in FIG. 11. FIG. 12 shows an overlay 1200 of stepped charging waveform 1100 and PPM signal 400.

Status control circuit 105 of the conventional game card is coupled to capacitor 104 and generates a status signal indicating the charging state of capacitor 104. Because the steps of stepped charging waveform 1100 are narrow and short, the quantified error is negligible and therefore status control circuit 105 is insensitive to the difference between stepped charging waveform 1100 and conventional charging waveform 200.

Mode 3. A Conventional Input Device Coupled to a Bimodal Game Card

When a conventional input device 101 is coupled to bimodal interface 302, a conventional charging waveform 200 is received at input port 313 and status control circuit 307 generates a corresponding status signal coupled to program interface 314.

Therefore, the game control system and method of the present invention generates input device status information with increased speed and accuracy. The game control system is additionally back-compatible with conventional input devices and game cards conforming to the IBM game port standard.

What is claimed is:

1. A computer control interface for coupling an input device to a program interface, the computer control interface comprising:

an input port for coupling to the input device;

a pulse position detector coupled to the input port and having a status data output coupled to the program interface, for generating status data responsive to a received pulsed control signal comprising a plurality of pulses each separated by a time duration; and a resistance detection circuit coupled to the input port and having a status signal output coupled to the program interface, for generating a status signal responsive to a variable resistance input.

2. The computer control interface of claim 1 wherein the pulse position detector further comprises:

a pulse detector coupled to the input port and having an output indicating a pulse detection responsive to detecting a pulse;

a counter having a reset input coupled to the pulse detector output and having a count output, for counting the time duration between pulse detection; and a storage device coupled to the counter output for storing the count output.

3. The computer control interface of claim 1 wherein the resistance detection circuit comprises:

a capacitor coupled to the input port;

a status circuit coupled to the capacitor for discharging the capacitor responsive to a first control signal received from the program interface and for setting the status signal to a first state responsive to the capacitor being discharged and to a second state responsive to the capacitor being charged above a threshold.

4. The computer control interface of claim 3 wherein the resistance detection circuit is compatible with the IBM standard game port.

5. A computer control system for interfacing with a program interface, comprising:

an input device comprising:
an output port;
a control device having a plurality of selectable states; and
a pulse position generator coupled to the control device, the pulse position generator having a pulsed output coupled to the output port and having pulses occurring at time intervals corresponding to the plurality of selectable states; and a first control interface comprising:
a pulse detector coupled to the pulsed output;
a counter having a reset input coupled to the pulse detector, for measuring the time intervals of the pulses; and
a storage device having a plurality of inputs coupled to the counter, having a plurality of outputs coupled to the program interface and having a control input coupled to the pulse detector, the storage device for storing the measured time interval and being accessible by the program interface.

6. The computer control system of claim 5 further comprising a resistance detection circuit having an input node coupled to the output port and a status output coupled to the program interface.

7. The computer game control system of claim 6 wherein the resistance detection comprises:

a capacitor coupled to the input port;

a status circuit coupled to the capacitor for discharging the capacitor responsive to a first control signal received from the program interface and for setting the status output to a first state responsive to the capacitor being discharged and to a second state responsive to the capacitor being charged above a threshold.

8. The computer control system of claim 5 wherein the pulse position generator is an astable multivibrator.

9. The computer control system of claim 8 wherein the astable multivibrator comprises a first monostable multivibrator cross-coupled with a second monostable multivibrator.

10. The computer control system of claim 9 wherein the input device is a joystick.

11. A computer controller for generating status data for a program interface, comprising:

a control device having a plurality of selectable states and having an output node having a plurality of control states each corresponding to a selectable state;

a pulse position generator coupled to the control device output node, the pulse position generator having a pulsed output, the pulsed output occurring at time intervals corresponding to one the plurality of control states of the control device output node; and a pulse position detector coupled to the pulsed output and to the program interface for measuring the pulse interval to generate status data.

12. The computer controller of claim 11 wherein the control states are resistance states and further comprising a resistance detection circuit coupled to the control device output for generating a status signal responsive to the resistance state and coupled to the program interface.

13. The computer controller of claim 11 wherein the pulse position detector comprises:

a pulse detector coupled to the pulsed output;

a counter having a reset input coupled to the pulse detector, for measuring the time intervals of the pulses; and a storage device having a plurality of inputs coupled to the counter, having a plurality of outputs coupled to the program interface and having a control input coupled to the pulse detector, the storage device for storing the measured time interval and being accessible by the program interface.

14. The apparatus of claim 11 wherein the pulse position generator is an astable multivibrator.

15. The apparatus of claim 14 wherein the astable multivibrator comprises a first monostable multivibrator cross-coupled with a second monostable multivibrator.

16. A user-actuated control device for interfacing to an input port of a computer game interface card, comprising:

a user-actuated control mechanism having a plurality of user-selectable states;

a variable resistance circuit coupled to the user-actuated control mechanism, having a plurality of resistance values corresponding to a plurality of the plurality of user-selectable states; and a pulse position modulation circuit coupled to the variable resistance circuit for generating a pulse position signal having a plurality of pulse frequencies corresponding to a plurality of the plurality of resistance values.

17. The user-actuated control device of claim 16 wherein the pulse position modulation circuit is an astable multivibrator.

18. The user-actuated control device of claim 17 wherein the astable multivibrator comprises a first monostable multivibrator cross-coupled with a second monostable multivibrator.

19. A method for generating control data for a computer in response to a command received from a control device, the method comprising the steps of:

supplying the command using a pulse position signal;

supplying the pulse position signal to the computer;

responsive to the computer having a pulse position decoding circuit, decoding the pulse position signal to generate corresponding control data; and responsive to the computer not having a pulse position decoding circuit, detecting a resistance to generate corresponding control data.

20. The method of claim 19 wherein the step of decoding the pulse position signal to generate corresponding control data comprises the steps of:

measuring the time duration between pulse positions to generate corresponding control data; and storing the control data.

21. The method of claim 19 wherein the step of detecting a resistance to generate corresponding control data comprises the steps of:

charging a capacitor using the pulse position signal; and measuring the charging time of the capacitor to derive control data corresponding to the measured charging time.

* * * * *